United States Patent [19]

Muscat

[11] Patent Number: 4,828,317
[45] Date of Patent: May 9, 1989

[54] CONVERTIBLE TOP FRAME WITH QUARTER WINDOWS

[76] Inventor: Peter P. Muscat, 14980 Waterfall Rd., Northville, Mich. 48167

[21] Appl. No.: 13,121

[22] Filed: Feb. 10, 1987

[51] Int. Cl.[4] .................................................. B60J 7/12
[52] U.S. Cl. ................................. 296/122; 296/107; 296/116
[58] Field of Search ...................... 296/146 (U.S. only), 296/201 (U.S. only), 107, 116, 117, 121, 122

[56] References Cited

U.S. PATENT DOCUMENTS

| | | | |
|---|---|---|---|
| 1,539,209 | 5/1925 | Rathbun | 296/116 |
| 2,267,471 | 12/1941 | Keller | 296/107 X |
| 3,180,675 | 4/1965 | Adamski | 296/117 |
| 3,321,238 | 5/1967 | Brynn | 296/117 |
| 3,536,354 | 10/1970 | Ingram | 296/107 X |
| 4,573,732 | 3/1986 | Muscat | 296/108 |

FOREIGN PATENT DOCUMENTS

| | | | |
|---|---|---|---|
| 141199 | 11/1934 | Fed. Rep. of Germany | 296/107 |
| 994245 | 11/1951 | France | 296/107 |
| 134506 | 10/1929 | Switzerland | 296/107 |
| 157497 | 12/1932 | Switzerland | 296/107 |

Primary Examiner—Dennis H. Pedder
Attorney, Agent, or Firm—John R. Benefiel

[57] ABSTRACT

A top frame for convertible automobiles is disclosed foldable so as to not require a reduced width rear seat. The top frame includes fore and aft spaced pillar members pivoted to a rear side rail on each side to form a linkage system moving a quarter window up and down with the top frame. The various pivot axes are skewed to produce outwardly spread folded side rails and pillar members to preserve the rear seat width. A secondary linkage system causes folding of the forward side rails and one of a plurality of frame bows. A cam mounting of the lower end of the forward pillar causes outward movement of the bottom of the quarter window as the frame is raised to achieve sealing of the quarter window.

The quarter window inclination is reduced as the frame is lowered by the cam mounting as well as by an outward movement of the top of the quarter window caused by an angled pivot connection of the supporting forward pillar.

10 Claims, 7 Drawing Sheets

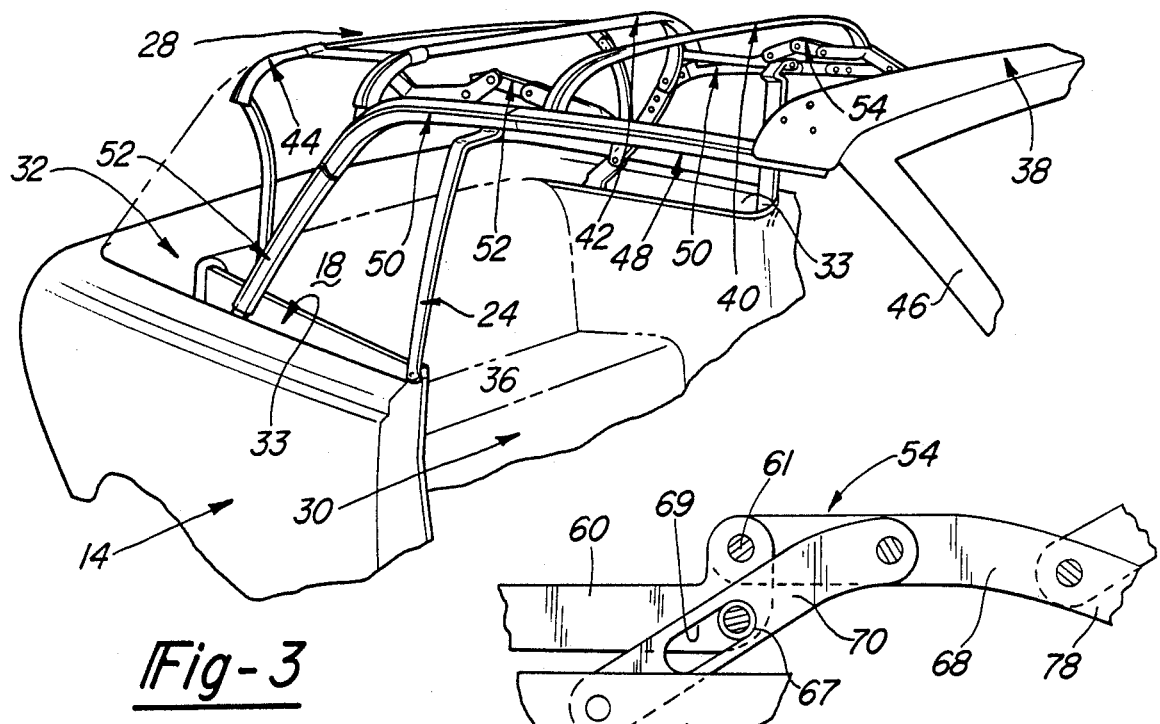
Fig-3
Fig-4A
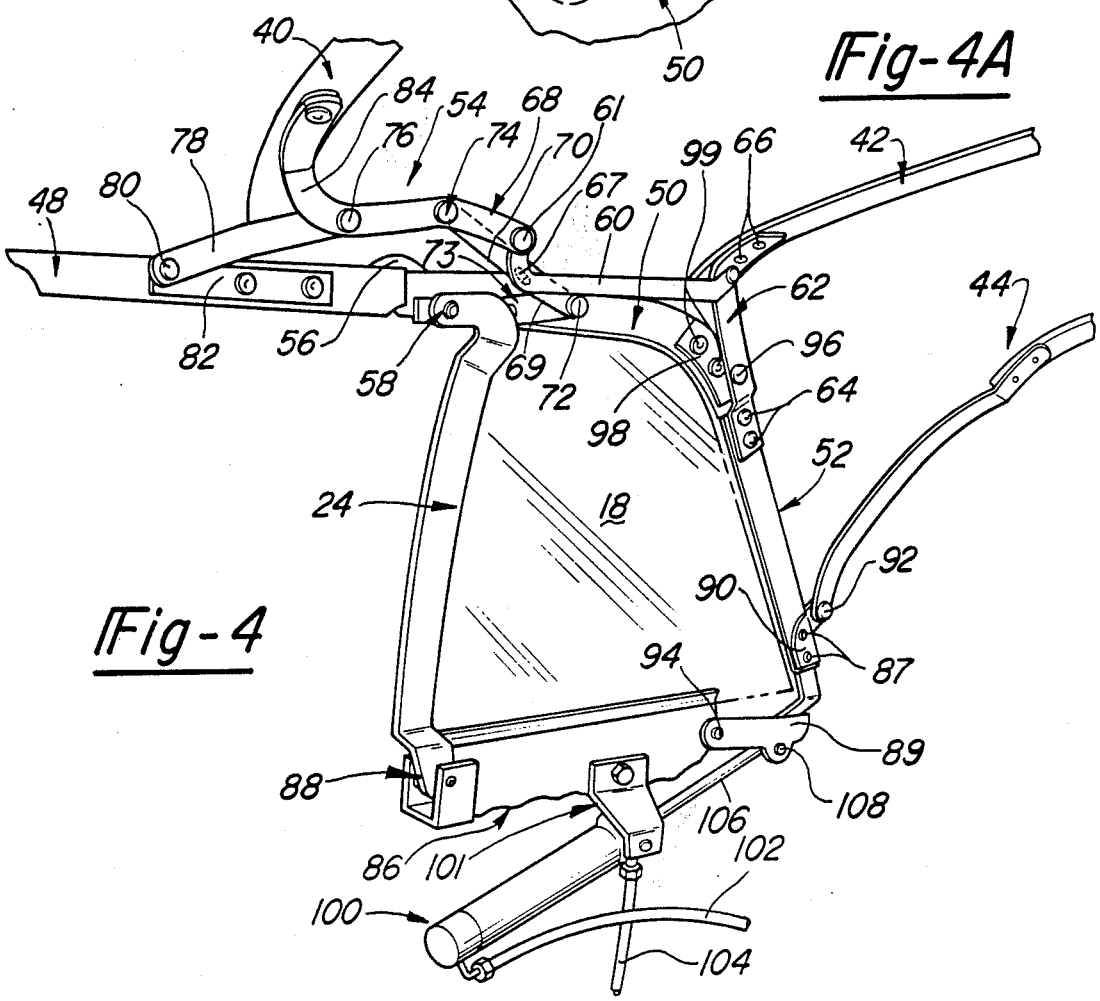
Fig-4

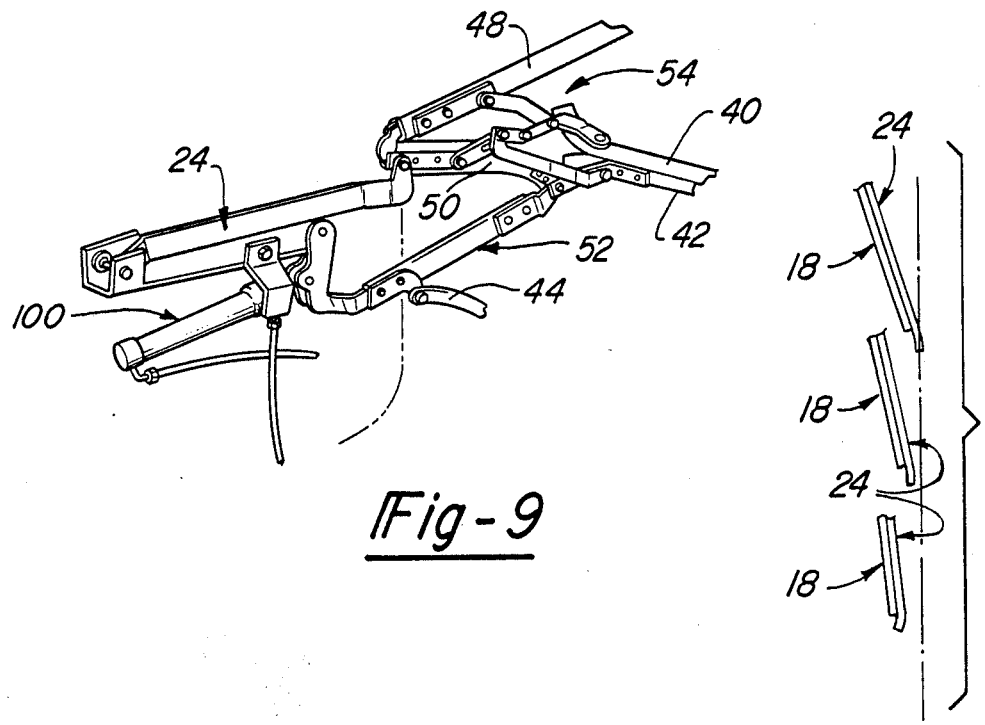
Fig-9
Fig-10A
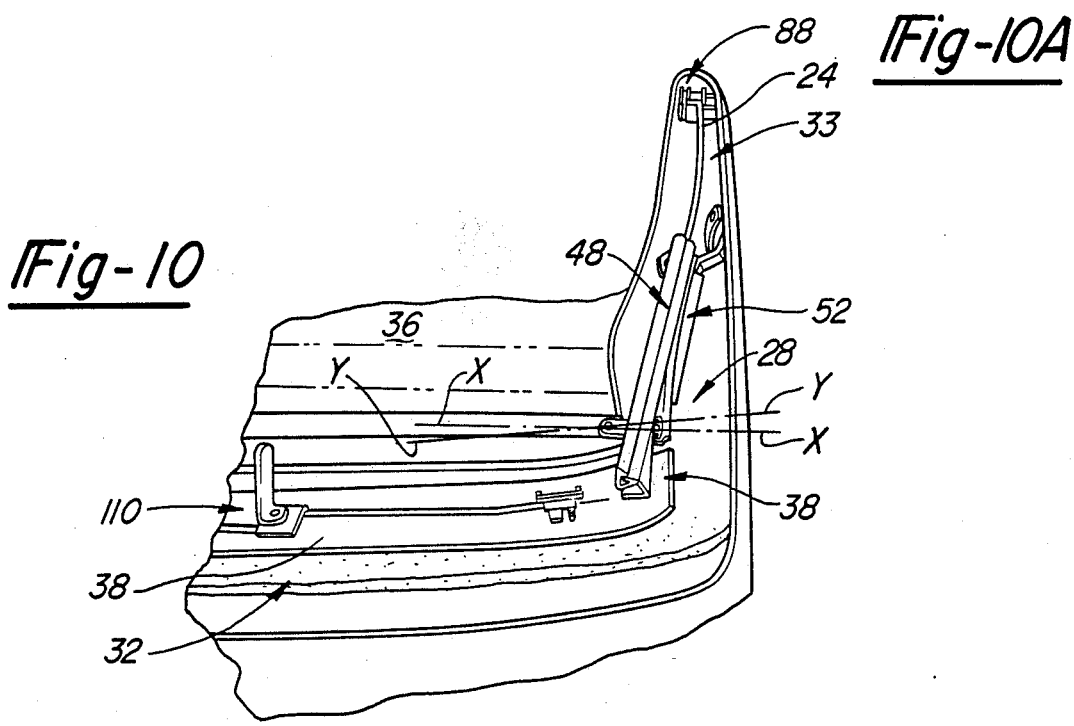
Fig-10

CONVERTIBLE TOP FRAME WITH QUARTER WINDOWS

FIELD OF THE INVENTION

This invention concerns automobile body components and more particularly a top frame for convertible autos in which the top may be folded down into a storage space extending along side and behind the rear of the passenger compartment.

BACKGROUND OF THE INVENTION

Convertible tops for autos typically comprise a foldable frame including a pair of unitary or sectional parallel side rails extending alongside and above the passenger compartment with bows extending laterally between the side rails, over which is stretched a fabric covering. The frame typically folds together into a generally U-shaped collapsed configuration for storage. The U-shape is formed by the side rails pivoted down to lie to the rear, connected by the bows extending between the rear most ends of the side rails and any supporting pillar members.

When the mechanism is power operated, one or more power cylinders are drivingly connected to drive members extending to the rear of each side rail so that they will pull each side rail to the rear to "accordion" fold the pivoted-together sections of the side rails when the top is lowered.

In this design the top frame when folded down is of a considerable depth which in turn produces an undesirable, relatively bulky, contour behind the rear seat.

Auto styling in recent years has featured inwardly sloping side glass so that the roof line is narrower than the passenger compartment. When this styling is repeated in the convertible models, a reduction of rear seat width usually results since the side rails are necessarily spaced closer together than the normal width of the rear seats. When the top is lowered, the side rails are moved into storage spaces located to reduce the width of the rear seat.

In U.S. Pat. No. 4,573,732, issued to the present inventor, there is disclosed a manually operated convertible top frame featuring unitary side rails each pivoted to a rear pillar, which side rails swing out to diverge forwardly when being pivoted down to enable the forward ends to be positioned further outward than the raised position spacing of the side rails, to avoid the loss of rear seat width.

The present invention is concerned with achieving a similar result in power operated tops with side rails composed of pivoted together sections.

The present inventor has previously developed such a top frame for body styles having quarter windows to the rear of the side door windows. In such previous designs, the top frame included a "B" pillar member on each side located just forward of the respective quarter window which was hinged thereto, with a "C" pillar extending along the rear edge of the quarter window.

Each "B" and "C" pillar formed a part of the frame folding linkage system which enabled stable control over leading ends of the folded sectional side rails, with forward located power cylinders providing a compact collapsed height. A diverging angle of the side rail sections preserved the rear seat width.

This design carried the quarter windows down into the side wells as the frame was lowered. The laterally curved contour of the quarter windows creates a substantial width of the quarter window, which in turn required the pivot point of the "B" pillar to be located sufficiently rearward so that storage of the glass itself did not require a reduction in rear seat width. One of the window edges was hinged to the "B" pillar, also necessitating a pivot location relatively far spaced to the rear. This location of the pivot axis resulted in the quarter windows moving down into the region occupied by the rear wheel wells, necessitating controlled hinging of the quarter windows to clear these structures.

The aforementioned prior design also incorporated complex linkages to accommodate the swing out action of the side rails to the straight back pivoting of the "B" pillars as the frame is lowered.

In U.S. Pat. No. 2,267,471, issued to Keller, there is disclosed a convertible top frame in which the quarter windows are carried by the convertible frame so as to be lowered as the frame is lowered. Such top frame does not provide a solution to the problem of reduced width rear seats, as outlined above. The quarter window frame in that design does not form a part of the frame linkage, and adds to the complexity of the top frame.

SUMMARY OF THE INVENTION

The present invention provides a convertible top frame having a compact collapsed height; and, allows swing out action of multisection side rails without requiring complex linkages and hinged quarter windows to clear the wheel wells.

The foldable top frame according to the present invention includes "B" and "C" pillars, each directly pivoted to a rear side rail section without an intermediate linkage to form a simple four bar linkage which allows stable and controlled powered let down action by formed located power cylinders acting on the "C" pillars.

The leading edge of each quarter window is permanently affixed to a "B" pillar, and the "B" pillar is pivoted at its lower end at a relatively forward position in a respective side well so as to carry the quarter window into a region therein forward of the wheel wells and thereby obviate the need for gross hinging movement thereof to clear the same.

Each "B" pillar is pivoted about a substantially horizontal axis skewed slightly from a direction normal to the longitudinal axis of the automobile outwardly, so that the point of connection of the upper end thereof to a respective rear side rail section moves outward as a swing out action of the rear side rail section proceeds. The swing out action of the rear side rod section in turn is produced by a skewed pivot axis of the pivot connection of each of the side rail rear sections to the upper end of the connected "C" pillar.

The lower pivoted end of each "B" pillar is cammed out and in as the "C" pillar is pivoted up and down to carry the quarter window inward as lowering occurs to offset the effect of the outwardly skewed "B" pillar pivot axis. The outward movement of the top of the "B" pillar caused by the skewed pivot axis combined with the inward movement of the bottom of the "B" pillar reduces the inclination and thus the effective width of the curved quarter window, enabling storage in the side wells without reduction in seat width.

The outward movement of the lower pivoted end of the "B" pillar occurring when the top is raised also forces the quarter windows into tight engagement with a seal located to be pressed against the lower edge of the quarter window.

The intermediate top bows are operated by a secondary linkage system driven by the "B" pillar pivot motion, which linkage also accomplishes folding a front section of the respective side rails. The secondary linkage system includes a pin and slot connection between a swing link and a draw link to minimize a dead center condition when the top is fully raised. The secondary linkage system also operates a fold down motion of an intermediate bow to enable the intermediate bow to be located where ever necessary so as to move into the storage space region located behind the rear seats.

DESCRIPTION OF THE DRAWINGS

FIG. 3 is a perspective view of a convertible top frame according to the present invention with portions of the adjacent auto body structure shown in phantom.

FIG. 4 is a fragmentary interior perspective view of portions of the convertible top frame shown in FIG. 3 in the raised position.

FIG. 4A is an enlarged reverse view of portions of the secondary linkage system shown in Figure 4.

FIG. 9 is a perspective view of the top frame portions shown in FIG. 8 as it approaches the fully lowered position.

FIG. 10 is a downward perspective view of the right hand portion of the fully lowered top frame and adjacent auto body portions.

FIG. 10A is a diagrammatic end view of the quarter window depicting the change in inclination as the top frame in lowered.

DETAILED DESCRIPTION

In the following specification, certain specific terminology will be employed for the sake of clarity and a particular embodiment described in accordance with the requirements of 35 USC 112, but it is to be understood that this is not intended to be limiting, inasmuch as the invention is capable of taking many forms and variations within the scope of the appended claims.

Figure 1:
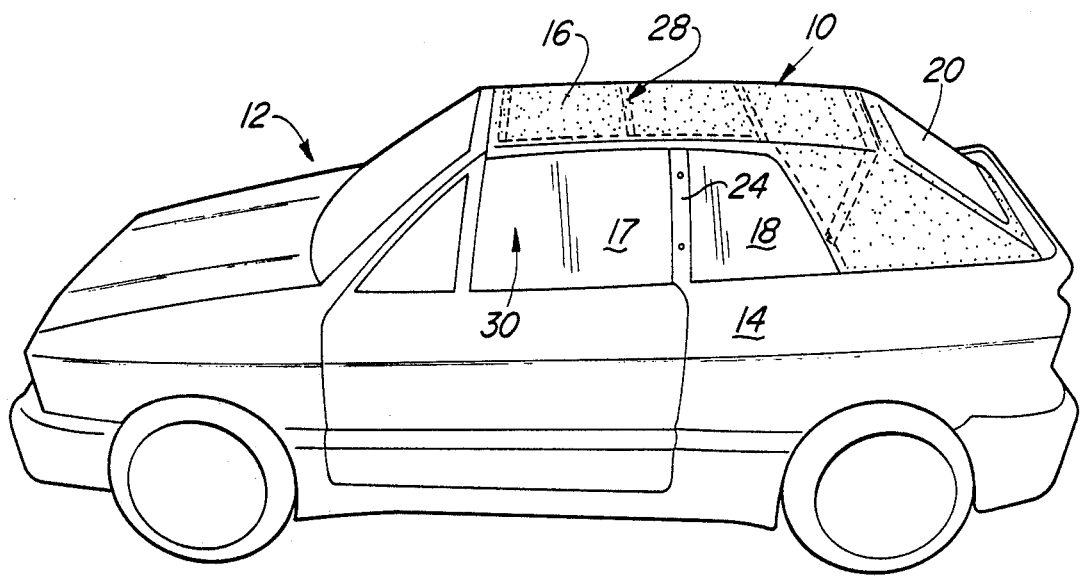
FIG. 1 is a side elevational view of an auto having a convertible top incorporating the frame according to the present invention.

Referring to FIG. 1, the convertible top 10 according to the present invention is contemplated as being utilized for a passenger automobile 12, enclosing the passenger compartment 30 defined within the automobile body 14, with the top 10 in the fully raised position.

The top 10 comprises a covering 16 of a fabric such as the polyester fibre material Dacron (tm) stretched over a foldable top frame 28 according to the present invention, as will be described in detail hereinafter, which may be raised to enclose the passenger compartment 14, or lowered to be stowed in a storage space defined within the auto body 14, as will be described.

According to one aspect of the present invention, the convertible top 10 incorporates quarter windows 18 to the rear of conventional side windows 17 so as to be able to be raised and lowered therewith, in addition to the rear window panel 20, sewn into the fabric covering 16 in conventional fashion.

Figure 2:
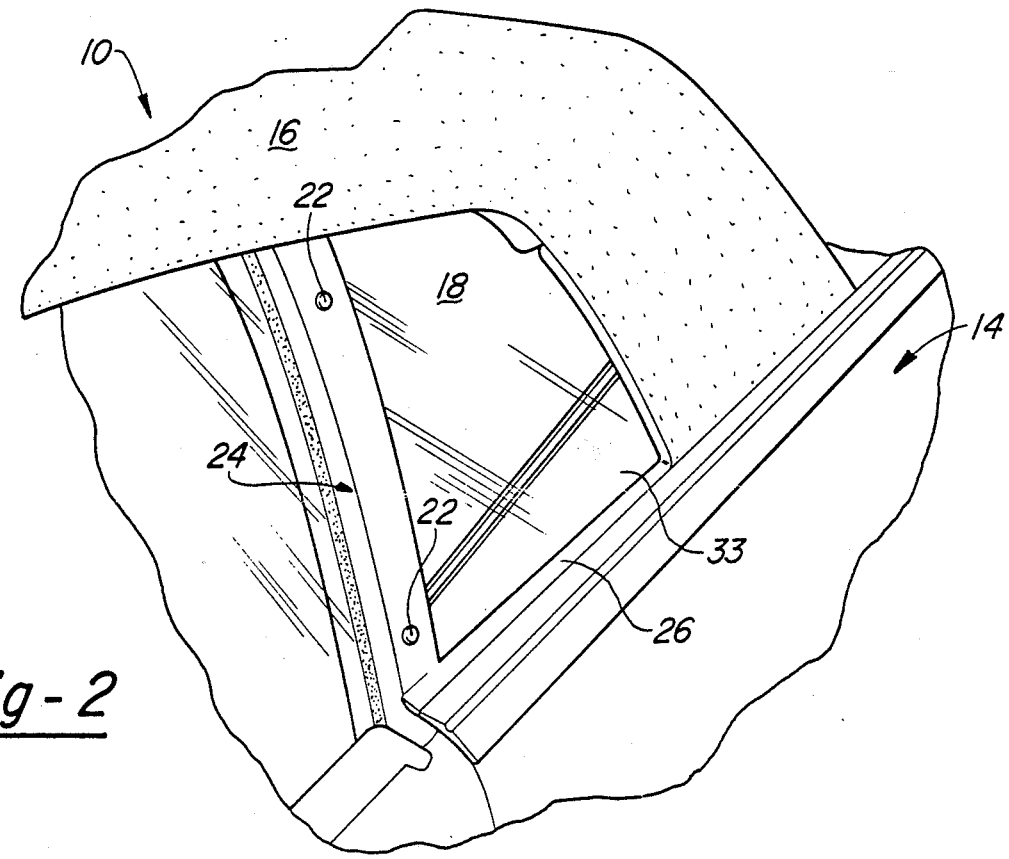
FIG. 2 is a fragmentary perspective view of a portion of the convertible top shown in FIG. 1 adjacent the auto quarter window.

FIG. 2 illustrates that the rear quarter windows 18 are fixed along the frontal edge by fasteners 22, to a forward B pillar member 24 included in the foldable top frame 28 over which the covering 16 is stretched. Quarter windows 18 are pivoted downward when the top 10 is lowered and are each configured to be able to be fit in a space between the adjacent forward "B" pillar member 24 and a rear "C" pillar member 52, said space defined in respective storage space side well regions 33 immediately beneath the quarter windows 18.

Sealing strips 26 are disposed along the adjacent portions of the body 14, against which the quarter windows 18 are pressed as the quarter windows 18 are raised, by means to be described hereinafter.

FIG. 3 illustrates the convertible foldable top frame 28 enclosing the passenger compartment 30 defined by the auto body 14. The foldable top frame 28 is adapted to be lowered into a storage space 32 extending to the rear of rear seats 36 and with side well regions 33 along either side to be generally of U-shaped configuration, with the side wells 33 tapering down in width towards the front thereof.

The foldable top frame 28 includes a plurality of bows extending laterally across the passenger compartment 30, including a header bow 38, a first intermediate bow 40, a second intermediate bow 42, and a rear bow 44.

The header bow 38 is adapted to be received atop the windshield frame 46 and latched thereto by mechanisms well known in the art, each end of the header bow 38 connected to the forward end of a respective right and left forward side rail 48 extending alongside the passenger compartment 30.

Right and left rear side rails 50 are each pivoted at their forward ends to a rear end of a respective forward side rail 48, and extend over the top of a respective quarter window 18.

The forward pillar members 24 when fully raised extend generally vertically along the forward B edge of a quarter window 18 and are pivotally connected at their upper end to a respective rear side rail 50.

Left and right rear C pillar members 52 extend generally vertically along the rear edge of the respective quarter window 18 and are each pivotally connected at their upper end to the rear end of a respective rear side rail 50.

Each of the forward B and rear C pillar members 24 and 52 are pivotally mounted within side wells 33 so as to be able to be swung between a generally vertically raised position and a generally horizontal lowered position as will be described, so that together with the rear side rails 50, a four bar linkage system is created defining an opening within which a quarter window 18 is disposed.

Swinging motion of the rear C pillar members 52 is utilized to operate a secondary linkage system 54 which causes folding of the forward side rails 48 and first intermediate bow member 40 as will be described herein.

FIG. 4 illustrates further details of the above described relationships of the components of the foldable top frame 28, with the various members shown in simplified form, to more clearly illustrate the relationships.

The forward side rails 48 are pivotally connected to the rear side rails 50 by means of hinge plates 56 disposed in oppositely facing slots formed in the respective ends of these members.

The upper ends of the forward B pillar members 24 are pivotally connected to a forward end of a rear side rail member 50 by means of pins 58.

The secondary linkage system 54 establishes a driving connection between the forward side rails 48 and the rear C pillar members 52 to cause the forward side rails 48 to be folded back as the rear C pillar members 52 are swung back. This motion is induced by rearward movement of an operating link 60 pinned at its rear end to a rear pillar member extension 62 affixed to the upper end of the rear C pillar member 52 with fasteners 64, and to the second intermediate bow 42 with fasteners 66.

The leading end of the operating link 60 is pinned at 61 to an intermediate link 68, and also has a pin 67 and slot 69 connection with a swing link 70 pinned at 72 to a reinforcing plate 73 fixed to rear side rail 50.

Intermediate link 68 is also pinned at 74 to the swing link 70 and at its forward end at 76 to one end of a drive link 78 pinned at 80 to a forward side rail 48, through reinforcing plates 82, affixed thereto.

The first intermediate bow 40 is also connected to an end portion 84 of intermediate link 68 to also be folded back by operation of the secondary linkage system 54.

The forward B pillar members 24 are pivotally mounted to body structure 86 in the side wells 33 at their lower ends by pivot mounting means of supporting cam pivots 88 described herein in further detail, which enables swinging movement of the forward "B" pillar members 24 about a generally horizontal axis extending transversely to the longitudinal axis of the automobile, between a generally vertical raised position and a lowered, generally horizontal position.

The pivoting motion is skewed to produce an outward movement of the upper ends of the forward B pillar members 24 for purposes as described.

The rear C pillar members 52 are each pivotally mounted at their lower end by a drive link member 89 fixed thereto by fasteners 87 extending through reinforcing plate 90, which also pivotally mounts rear bow 44 at 92 as shown.

Drive link 89 is pinned at 94 to the side well body structure 86 to enable swinging of the rear pillar members between a generally vertical raised position and a generally horizontal position.

The upper end of each rear C pillar member 52 is pivotally joined to the trailing end of a respective rear side rail member 50 by a pivot pin 96 passing through extension 62 and reinforcing plate 98 affixed to rear side rail 50 with fasteners 99.

The axis of the pivoting motion of the side rail members 50 and the respective upper end of a rear C pillar member 52 is skewed so that the rear side rails 50 swing from the vehicle center in the horizontal plane as the rear pillar members 52 fold downwardly to assume the outwardly angled position shown in FIG. 10. FIG. 10 also shows axis X normal to the automobile longitudinal axis, and Y represents the skewed pivot axis of the connection between the rear pillar member 52 and the joined rear side rail member 50.

Two way power cylinders 100, are mounted on brackets 101 bolted to the body structures 86, and are supplied with hydraulic fluid via lines 102, 104 to act through respective link operating rods 106 pinned at 108 to drive respective link members 89 so that corresponding swinging motion of the rear pillar members 52 is powered thereby.

FIG. 4A is a reverse view of portions of the secondary linkage system 54 to more clearly depict the details thereof.

The operating link 60 acts directly through pin 61 on intermediate link 68 and also via pin 67 and slot 69 on swinglink 70. Since swing link 70 is more inclined, this helps to overcome the "dead center" condition during lowering.

Figure 5:
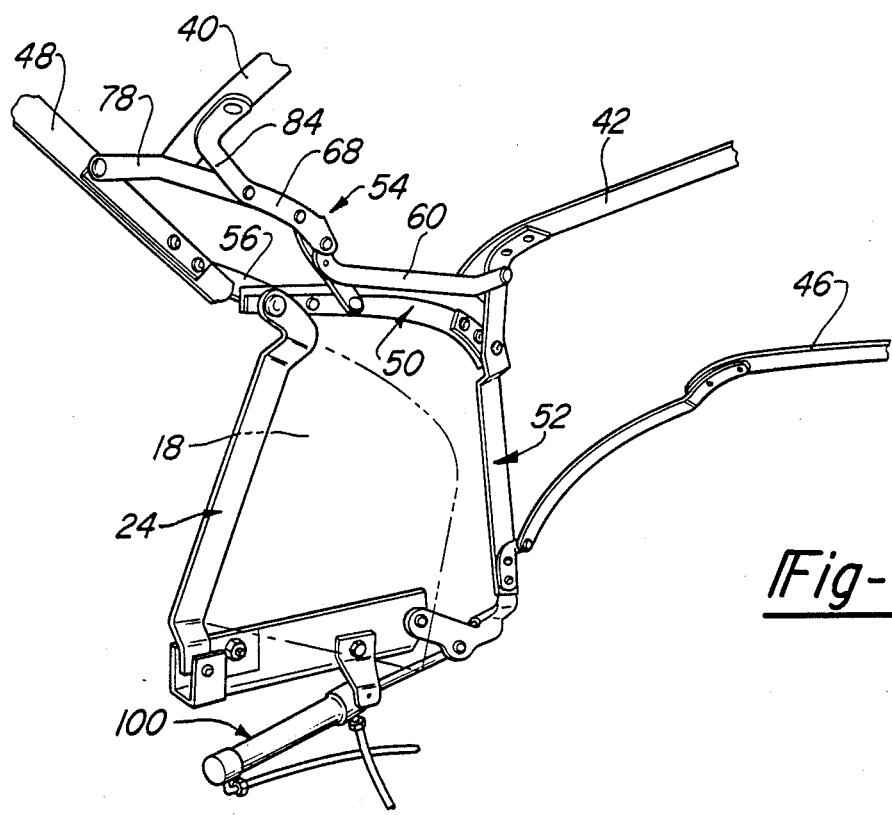
FIG. 5 is a perspective view of the top frame portions shown in FIG. 4 in a partially lowered position.

FIG. 5 illustrates the first stage of lowering motion, in which the rear pillar member 52 has been swung rearwardly slightly. The operating link 60 acting through intermediate link 68 and drive link 78 causes the forward side rail 48 to be swung upwardly on hinge plate 56. This effort is assisted by the pin and slot connection of swing link 70 which overcomes the close to dead center condition of other linkage due to the sharper angle of swing link 70.

The quarter window 18 begins to descend into the side well 33 as the forward B pillar member 24 tilts to the rear, pulled by rear side rail member 50. First intermediate bow 40 also begins to swing up on link end portion 84.

Figure 6:
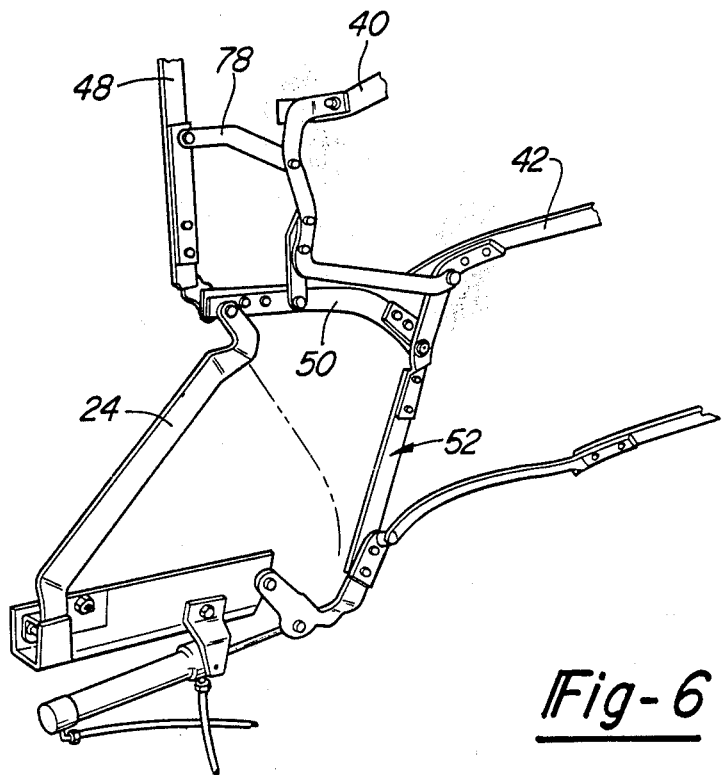
FIG. 6 is a perspective view of the top frame portions shown in FIG. 5 in a further lowered position.

FIG. 6 illustrates further lowering, with the forward side rail 48 assuming a vertical position and more pronounced inclinations of forward pillar member 24 and rear pillar member 52.

The rear bow 44 is supported by the top cover 16 and is allowed to drop as the second intermediate bow 42 moves to the rear.

Figure 7:
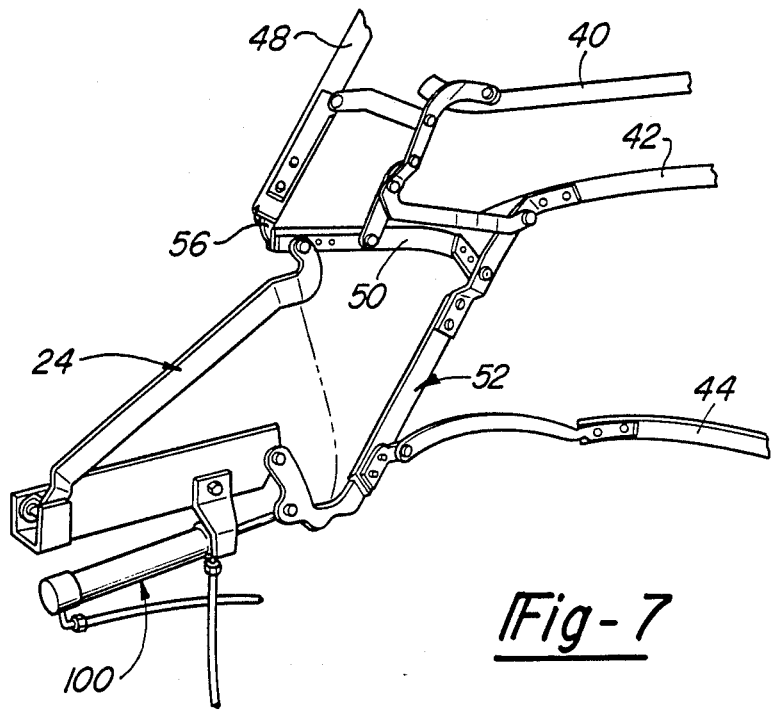
FIG. 7 is a perspective view of the top frame portions shown in FIG. 6 in a further lowered position.
Figure 8:
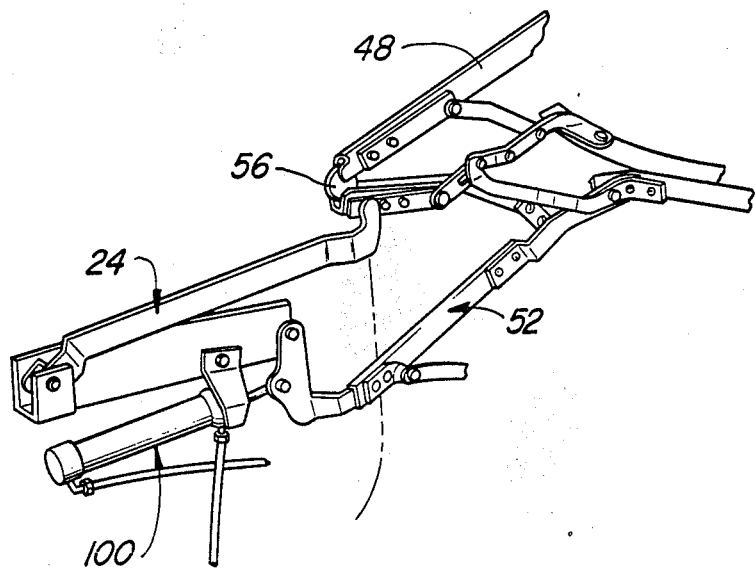
FIG. 8 is a perspective view of the top frame portions shown in FIG. 7 in a further lowered position.

FIGS. 7, 8 and 9 illustrate further progressions in the lowering motion in which forward side rails 48 fold downwardly toward rear side rails 50, and the first intermediate bow 40 is moved downwardly towards but nested within second intermediate bow 42.

FIG. 10 illustrates the top frame 28 approaching the fully collapsed position with the header bow 38 inverted extending across the storage space 32, the latching mechanism 110 exposed.

As discussed above the forward B pillar members 24 are pivotally mounted to swing about a generally horizontally pivot axis skewed outwardly from a direction normal to the automobile longitudinal axis so as to cause the upper ends of the forward pillar members 24 to swing out from the vehicle center as the pillar members 24 are lowered. This causes the upper end of each pillar member 24 to follow the point of pin connection 58 as it swings out due to the skew of the connection 96 causing the rear side rail 50 to swing outwardly. The pins 58 are also skewed in correspondence with the motion of the rear side rail 50 and forward B pillar 24.

In order to guide the quarter window 18 downwardly into the receiving space of the side wells 33 without interference, the cam pivot mounting 88 causes the lower ends of the forward B pillar members 24 to be moved inwardly as these members 24 are folded downwardly.

This also reduces the inclination of the quarter window 18 as shown in FIG. 10A.

Figure 11:
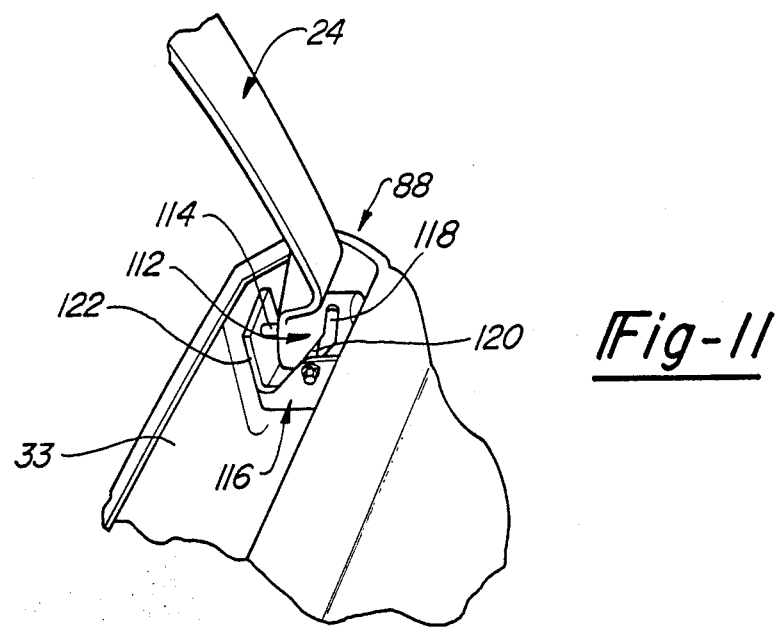
FIG. 11 is an enlarged fragmentary perspective view of the lower end of the right hand forward pillar member and supporting camming pivoted mount, shown with the forward pillar member in the raised position.

FIG. 11 illustrates the forward pillar member 24 in the raised position. A supporting hub 112 integral therewith is pivotally supported by a pin 114 on a bracket 116 affixed within side well 33.

Hub 112 has a cam slot 118 formed therein engaged with a cam pin 120 fixed in bracket 116. As shown, an end clearance exists between the left end of the hub 112 and the end plate 122 of bracket 116.

Figure 12:
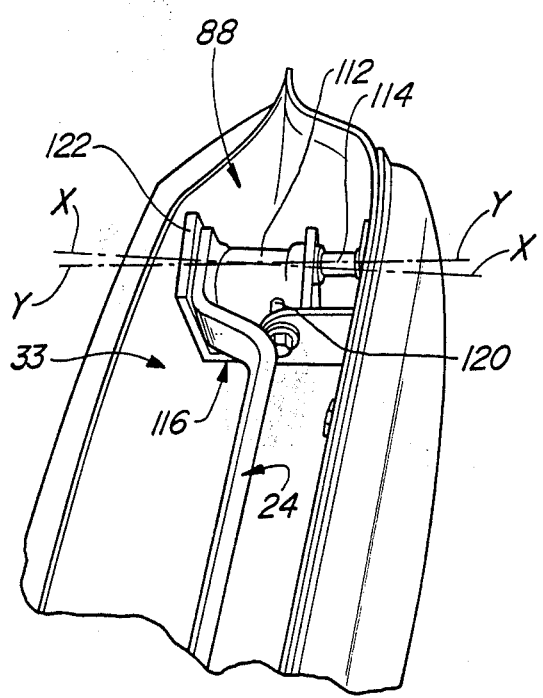
FIG. 12 is an enlarged fragmentary perspective view of the lower end of the right hand forward pillar member supporting camming pivoted mount, shown with the forward pillar member in the lowered position.

FIG. 12 illustrates the condition after forward pillar member 24 has been moved to the lowered, generally horizontal position.

The resulting rotation of hub 112 causes the cam pin 120 to force the hub 112 and lower end of forward B pillar member 24 to the left or inwardly against the end plate 122 of bracket 116.

This motion is utilized to guide the lower end of the quarter windows 18 into the side well regions 33, offsetting the effect of the outward skew of the pivot axis as shown in the centerlines in FIG. 12. Centerline X represents an unskewed line generally extending in the horizontal plane, normal to the automobile longitudinal axis, centerline Y representing the skewed centerline of the pivot axis of the "B" pillar 24 turning the free end thereof away from the automobile longitudinal axis. A slight downward skew (not shown) of the pivot axis out of the horizontal may also be employed as needed for proper clearance.

It will be appreciated by those skilled in this art, that all of the geometries of motion must be coordinated depending on the size and shape of the particular vehicle to produce proper operation and accommodation to such particular vehicle and the particular details of the top frame geometry.

The end result is to accommodate the various top frame members in the stowed position so that the narrow width of the roof line does not define and limit the rear seat area, by angling the position assumed by pillar members 24 and 52 in the lowered position as well as that of the folded side rails 48 and 50 in a forwardly diverging pattern as shown in FIG. 10.

It will be appreciated that the forward side rails 48 must be angled with respect to the header bow 38 to accommodate this condition.

Figure 13:
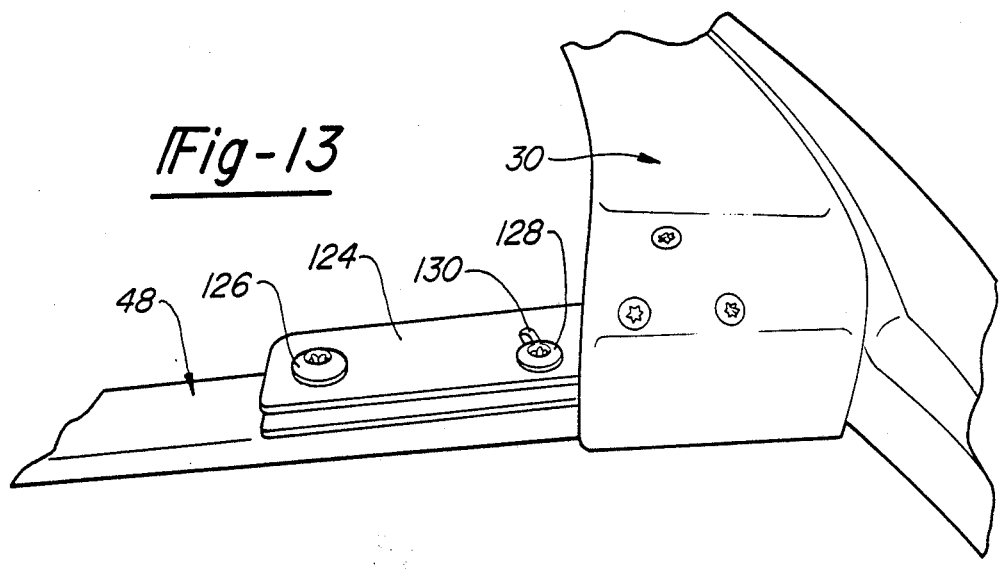
FIG. 13 is an enlarged perspective view of the right hand side rail and right end of the header bow, showing the swing connection therebetween.

FIG. 13 shows that header bow 38 is joined to forward side rail 48 by a bracket plate 124 and spaced screws 126 and 128 with forward screw 128 passing through a slot 130 to accommodate the angling shown in FIG. 10, while allowing return to a right angle condition as the top frame 28 is raised.

Figure 14:
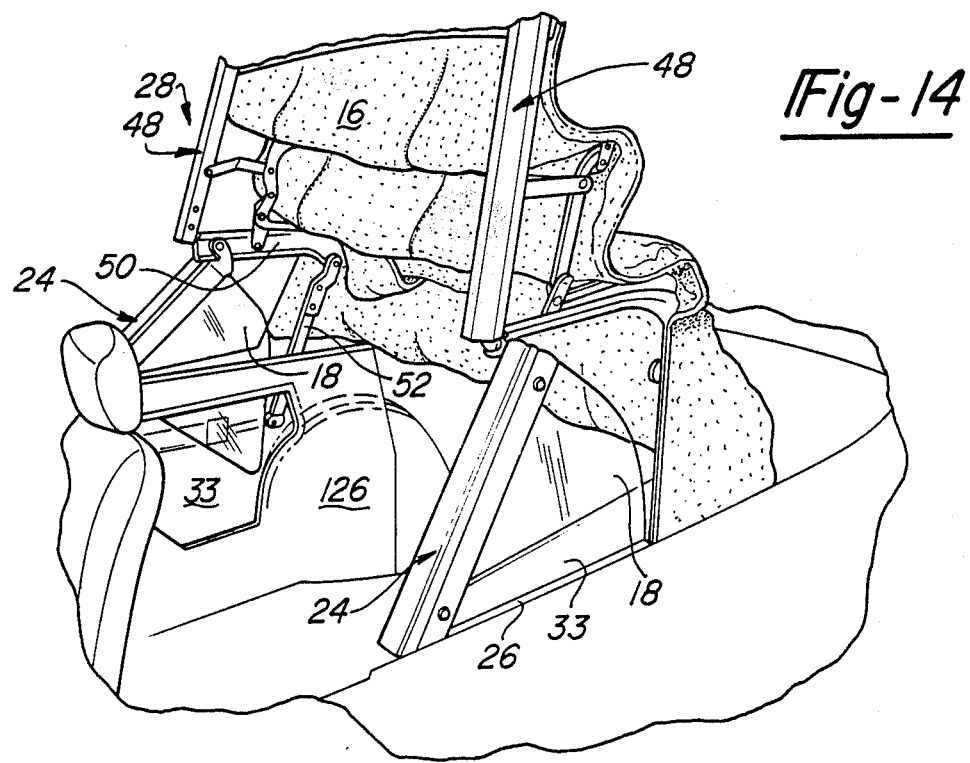
FIG. 14 is a perspective fragmentary view of the convertible top of FIG. 1, according to the present invention, shown in an intermediate raised position.

FIG. 14 illustrates the assembled top frame 28 in an intermediate position.

As noted, the quarter windows 18 are pivoted at an extreme forward position, and this allows the quarter windows in some auto bodies to be received in a side well space 33 forward of the wheel well 126 and obviate the need to guide and stow the quarter windows 18 away from that structure.

As noted, the lower ends of the forward B pillar members 24 move outwardly away from the vehicle longitudinal axis as they are raised and this motion is relied on to establish pressure of the quarter windows 18 against bottom seal 26 to ensure a good sealing contact.

It will also be understood that conventional seals will be employed elsewhere, i.e., on the side rail members 48 and 50 the edges of pillar members 24 and 52 to create seals with the respective edges of the quarter windows 18 and the side windows 17.

It will also be appreciated that many variations in geometry are possible to accommodate the concept to particular vehicle geometry.

I claim:

1. A convertible top frame installation including a foldable top frame for enclosing the passenger compartment of an automobile when in a raised position and adapted to be stowed in a generally U-shaped storage space extending to the rear of said passenger compartment and having a pair of side wells each extending alongside the rear portion of said passenger compartment when in a lowered stowed position, the installation comprising:

a foldable top frame including a pair of forward side rails extending above and along either side of the forward region of said passenger compartment with said top frame in a raised position;

a pair of rear side rails each pivoted to the trailing end of a respective forward side rail, extending above and alongside the rear region of said passenger compartment;

a plurality of bows connected at either end to said forward and rear side rails to extend across said passenger compartment, including a header bow connected to the forward end of each forward side rail;

a pair of forward pillar members and pivot mounting means for pivotally mounting each of said forward pillar members at the lower end thereof in a respective one of said pair of side wells about a substantially horizontal pivot axis extending generally transversely to the longitudinal axis of said automobile to be swingable from a generally vertical raised position to a generally horizontal stowed position extended rearwardly in said respective side well, in said raised position inclined inwardly towards said passenger compartment;

a pair of rear pillar members each spaced to the rear of a respective one of said pair of forward pillar members; an intermediate space, between each of said forward and rear pillar members; each of said rear pillar members pivotally mounted at the lower end thereof to be swingable between a generally vertical raised position to a generally horizontal, rearward extending stowed position;

each of said spaced forward and rear pillar members having a pivotal connection at the upper end to a respective rear side rail to establish a linkage system moved as a unit during raising and lowering of said top frame;

a pair of quarter windows each having a forward side, said forward side fixed to a respective one of said forward pillar members to be inwardly inclined towards said passenger compartment and configured to fit into said space between said forward and rear pillar members; and actuator means causing movement of said top frame between said raised and lowered position;

the pivot axis of said pivotal connection of the upper end of each of said rear pillar members and a respective rear side rail is skewed, comprising means to cause the forward end of each of said rear side rails to swing out from said passenger compartment as said rear pillar members swing to the rear and down from the raised position thereof;

the pivot axis of said pivotal mounting means for the lower end of each of said forward pillar members is skewed outwardly from a direction normal to the longitudinal axis of said automobile to cause an outward movement of the upper end of each of said forward pillar members as each of said forward pillar members swing rearwardly to the lowered position, whereby said upper end of each of said forward pillars moves outward with the forward ends of a respective rear side rail as said rear side rails swing out while pivoting on a respective rear pillar member to move to reduce the inward inclination of the quarter window affixed thereto as said top frame is lowered.

2. The installation according to claim 1 wherein each of said forward pillar member pivotal mounting means includes cam means shifting the lower end thereof inward as said forward pillar member pivots to the rear and down, and outward as said rear pillar member pivots upward and forwardly.

3. The installation according to claim 2 further including sealing means engaged by outward movement of said quarter window caused by operation of said cam means.

4. A convertible top frame installation including a foldable top frame for enclosing the passenger compartment of an automobile when in a raised position and adapted to be stowed in a generally U-shaped storage space extending to the rear of said passenger compartment and having a pair of side wells each extending alongside the rear portion of said passenger compartment when in a lowered stowed position, the installation comprising:

a foldable top frame including a pair of forward side rails extending above and along either side of the forward region of said passenger compartment with said top frame in a raised position;

a pair of rear side rails each pivoted to the trailing end of a respective forward side rail, extending above and alongside the rear region of said passenger compartment;

a plurality of bows connected at either end to said forward and rear side rails to extend across said passenger compartment, including a header bow connected to the forward end of each forward side rail;

a pair of forward pillar members and pivot mounting means for pivotally mounting each of said forward pillar members at the lower end thereof in a respective one of said pair of side wells about a substantially horizontal pivot axis extending generally transversely to the longitudinal axis of said automobile to be swingable from a generally vertical raised position to a generally horizontal stowed position extended rearwardly in said respective side well;

a pair of rear pillar members each spaced to the rear of a respective one of said pair of forward pillar members; an intermediate space, between each of said forward and rear pillar members; each of said rear pillar members pivotally mounted at the lower end thereof to be swingable between a generally vertical raised position to a generally horizontal, rearward extending stowed position;

each of said spaced forward and rear pillar members having a pivotal connection at the upper end to a respective rear side rail to establish a linkage system moved as a unit during raising and lowering of said top frame;

a quarter window mounted to each of said forward pillar members to be raised and lowered therewith and configured to fit into said space between said forward and rear pillar members; and actuator means causing movement of said top frame between said raised and lowered position;

a pair of secondary linkage systems, each drivingly interconnecting a respective one of said rear pillar members and associated forward side rail members, causing folding back of said forward side rail onto the associated rear side as said rear pillar member is pivoted to the rear when said top frame is lowered;

each of said secondary linkage system including a rear pillar member extension fixed to the upper end of said rear pillar member and extending above the upper end thereof with said top frame raised; an operating link pivotally connected at one end to said rear pillar member extension upper end, an intermediate link pivotally mounted at one end to said operating link, and a drive link pivotally connected at one end to said forward side rail and at the other end to the other end of said intermediate link, and a swing link pivoted at one end to said rear side rail member, and at the other end to said intermediate link, each of said links lying above said forward and rear side rails, whereby folding of said rear side rail onto said rear pillar member causes said operating link to move said swing link, and pull said intermediate and drive link to the rear, causing said forward side rail to be pivoted over onto said rear side rail member.

5. The installation according to claim 4 wherein said other end of said operating link and an intermediate portion of said swing link are interconnected by a pin and slot connection, whereby said operating link also pulls said swing link to be swung to the rear on the pivotal connection with said rear side rail.

6. The installation according to claim 5 further including a first intermediate bow connected at either end to a respective intermediate link, said first intermediate bow moved to the rear by operation of said secondary linkage systems as said rear pillar members are pivoted down.

7. The installation according to claim 6 further including a second intermediate bow connected at either end to the upper end of a respective rear pillar member extension.

8. The installation according to claim 7 further including a rear bow pivotally connected at either end to a lower section of a respective rear pillar member.

9. The installation according to claim 1 further including a pair of power cylinders each having an operating rod and each located in a respective side well, each extending rearwardly thereon with the operating rod thereof; means drivingly connecting each operating rod to a lower portion of a respective rear pillar member to enable powered lowering and raising of said top frame by operation of said pair of power cylinders.

10. In a foldable convertible top frame for enclosing the passenger compartment of an automobile, the improvement including a pillar member on either side of said passenger compartment, each pivoted at the lower end for pivotal movement, a quarter window affixed to the edge of each of said pillar members, each quarter window extending rearwardly with the respective affixed pillar member raised, and camming means moving the lower end of each of said pillar members outward as said pillar member is pivoted up; and sealing means engaged by the lower region of said quarter window as said pillar member lower end is pivoted to the vertical position.

* * * * *

UNITED STATES PATENT AND TRADEMARK OFFICE
CERTIFICATE OF CORRECTION

PATENT NO.  :   4,828,317
DATED       :   May 9, 1989
INVENTOR(S) :   Peter P. Muscat It is certified that error appears in the above-identified patent and that said Letters Patent is hereby corrected as shown below:

Column 2, line 36, "formed" should be --forward--.

Column 3, line 12, "where ever" should be --wherever--.

Column 3, line 46, "in" should be --is--.

Column 4, line 58, after "forward" insert --"B"--.

Column 4, line 59, delete "B".

Column 4, line 62, "C" should be --"C"--.

Column 4, line 67, "B and rear C" should be --"B" and rear "C"--

Column 5, line 7, "C" should be --"C"--.

Column 5, line 20, "B" should be --"B"--.

Column 5, lines 25, 26 and 30, "C" should be --"C"--.

Column 5, lines 43 and 53, "B" should be --"B"--.

Column 5, lines 55 and 64, "C" should be --"C"--.

Column 6, line 5, after "rear" insert --"C"--.

Column 6, lines 36, 57 and 68, "B" should be --"B"--.

Column 7, lines 4, 21 and 66, "B" should be --"B"--.

Column 10, line 16, after "side" insert --rail--.

UNITED STATES PATENT AND TRADEMARK OFFICE
CERTIFICATE OF CORRECTION

PATENT NO. : 4,828,317

DATED : May 9, 1989

INVENTOR(S) : Peter P. Muscat

It is certified that error appears in the above-identified patent and that said Letters Patent is hereby corrected as shown below:

Column 10, line 18, "system" should be -- systems --.

Signed and Sealed this

Twenty-seventh Day of February, 1990

*Attest:*

JEFFREY M. SAMUELS

*Attesting Officer*     *Acting Commissioner of Patents and Trademarks*